Dec. 12, 1939.  J. G. DIETRICH  2,183,306
ANIMAL FIGURE
Filed June 23, 1936  2 Sheets-Sheet 1

Inventor
Johannes Gotthilf Dietrich
by Roberts, Cushman & Woodbury.
Attys.

Dec. 12, 1939.                J. G. DIETRICH                2,183,306
                               ANIMAL FIGURE
                           Filed June 23, 1936           2 Sheets-Sheet 2

Inventor
Johannes Gotthilf Dietrich
by Roberts, Cushman & Woodberry
Attys.

Patented Dec. 12, 1939

2,183,306

UNITED STATES PATENT OFFICE 2,183,306

ANIMAL FIGURE

Johannes Gotthilf Dietrich, Berlin-Tempelhof, Germany

Application June 23, 1936, Serial No. 86,716
In Germany June 26, 1935

2 Claims. (Cl. 46—99)

This invention relates to a mechanical toy and more particularly to an animal figure having a remote control for the head and/or tail movement.

Heretofore animal figures with the remotely controlled heads were provided with means for moving the head, such means including an axis extending longitudinally through the trunk and terminating in a handle for remotely controlling the head, which handle formed the tail, or in place of the tail there was provided a remote control handle. In such constructions the rotary path of movement of the head was necessarily arranged parallel to the rotary path of the control handle situated at the end of the trunk, so that it was impossible to provide a head pivoted at right angles to the spinal direction, for example, a raised head of an animal figure in running or sitting posture. Moreover, in operating such constructions it was necessary to grasp the trunk of the figure with one hand while using the other hand for moving the handle or tail, and if it were desired to imitate the natural tail movement, it became necessary manually to manipulate the head proper, this instance likewise requiring the visible and necessary use of both hands, one for holding the figure and the other for moving the head.

In contradistinction to such constructions, the present invention provides an animal figure with a remote head control having the control handle or operating means arranged on the under side of the trunk wall, between or adjacent to the front legs of the animal figure.

In this manner it is not only unnecessary to arrange the head along or adjacent to the line connecting the head and tail, but it is possible to grasp the trunk of the animal figure with one hand and to actuate the remote control handle with one finger of the hand holding the animal, thus concealing the manipulation from the spectator. When so held the handle or operating means may be so manipulated as to execute a life-like head movement.

Furthermore, the same hand which holds the animal figure may actuate the head control as well as a mechanical voice device located at the under side of the trunk, thereby sounding the voice simultaneously or alternatively with moving the head. The arrangement is particularly advantageous in that the remote control handle may be utilized for fastening the animal control figure upon a carriage frame so that other fastening devices become unnecessary and a child may conveniently attach to and remove the figure from the carriage frame. Accordingly, as a child may use the animal either alone or with the carriage, its usefulness as a toy is greatly enhanced.

Further objects and advantages will be apparent from a consideration of the following description and accompanying drawings, wherein.

Figure 1:
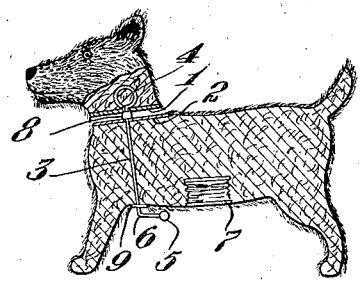
Fig. 1 is a side elevation, partly in section, showing a stuffed animal in running position.
Figure 2:
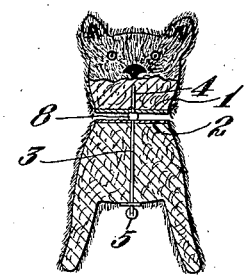
Fig. 2 is a front elevation, partly in section, of the animal shown in Fig. 1.
Figure 3:
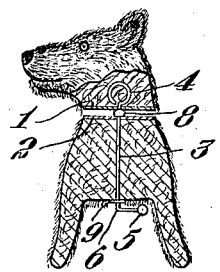
Figs. 3 and 4 are views similar to Fig. 2, but showing the head turned towards the right and left, respectively.
Figure 4:
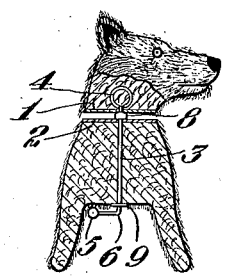

Each of the embodiments herein shown by way of illustration consists of a stuffed animal figure, simulating a dog, cat, or like quadruped having a trunk or body, a head and tail secured to the opposite ends of the trunk, and fore and hind legs, the various parts being of conventional design and construction having an outer covering of cloth or the like material preferably provided with a hairy finish, such as a nap or a pile fabric.

Referring to Figs. 1 to 4, the animal figure comprises a head mounted on a joint disk or plate 1 and the neck part of the trunk is likewise provided with a joint disk 2. The disks 1 and 2 are formed with central openings through which an operating rod 3 extends, and a bead or washer 8 surrounds the rod 3 between the disks 1 and 2, the bead being effective to decrease the friction between the parts, thus insuring a smooth and easy operation of the head. The upper end of the rod 3 is bent to provide a loop 4 which is firmly embedded in the center of the head, and the lower end of the rod 3 extends through the forepart of the trunk, emerging at its under surface adjacent to but rearwardly of the fore legs and terminating in an end shaped to provide a knob or handle 5 which is bent laterally to the axis of rotation 6 of the rod 3. A washer 9, surrounding the rod 3, is sewed or otherwise secured to the covering for the trunk and not only provides a protection against wear or damage resulting from manipulating the handle 5, but also a rigid journal for the rod 3.

The gap between the disks 1 and 2, though appearing somewhat exaggerated, is such that it may be substantially concealed by the hairy finish of the covering for the head and trunk, and likewise the handle 5 is here shown as somewhat exaggerated, it being understood that in actual practice it may be made relatively smaller and provided with a covering the same as or similar to the material covering the trunk, thus making it less conspicuous, if not substantially concealed from view.

A bellows-actuated mechanical voice, designated by the numeral 7, may be built in or secured to the under side of the trunk in any suitable manner, and as here shown the bellows is preferably disposed between the handle 5 and hind legs of the animal so that it may be operated by the same hand that holds the trunk.

Figure 5:
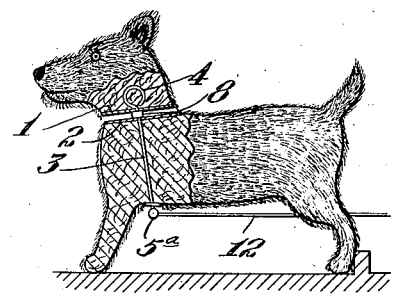
Figs. 5 and 6 are views, corresponding to Figs. 1 and 2, but showing an actuating handle of modified construction.
Figure 6:
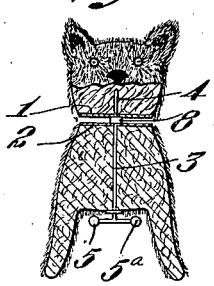

In Figs. 5 and 6 I have shown a modified arrangement wherein the end of the actuating rod 3 is provided with a pair of handles 5 and 5ª which extend in opposite directions, as shown more clearly in Fig. 6, the ends of the handles preferably terminating in loops to which may be attached a pair of cords 12. With this arrangement the animal figure may be mounted on a table or stand 10 having a rail or abutment 11 against which the hind legs may be disposed, and when thus positioned the handle may be operated by manipulating the cords 12.

Figure 7:
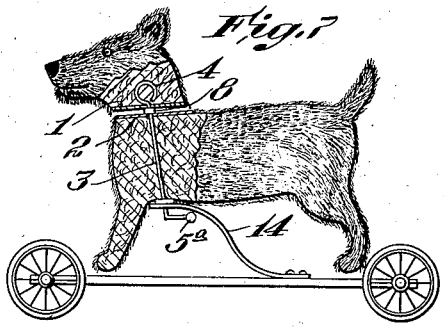
Fig. 7 is a side elevation, partly in section, showing an animal figure mounted on a carriage.
Figure 8:
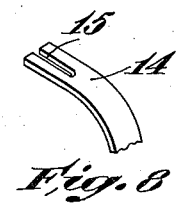
Fig. 8 is a detail view illustrating the preferred means of detachably securing the animal to the carriage.

In Fig. 7 an animal figure, such as is shown in Figs. 1 to 6, is mounted on a carriage 13 and one end of an arcuate strip or leaf spring 14 is secured to the carriage in any suitable manner. The free end of the spring 14 is provided with a slot 15 (Fig. 8) so that the end of the spring may be disposed about the rod 3 with its upper surface engaging the washer or plate 9, thus detachably securing the animal figure to the carriage. In this manner it is possible to secure animals of different sizes to the carriage, and where, as is preferred, the spring member 14 is resilient, it adjusts itself to the varying height of different sized animals and also to animals in different postures.

Figure 9:
Fig. 9 is a view similar to Fig. 1, but showing an animal in sitting position.

The embodiments shown in Figs. 9 to 13, illustrate the invention as applied to animal figures in sitting position, as distinguished from the standing or running positions shown in Figs. 1 to 7. Each of these embodiments is of the same general construction as those above described, and the same or similar reference characters have been applied to corresponding parts. The animal shown in Fig. 9 is substantially identical to that shown in Fig. 1, except that the animal is in sitting posture, the construction and arrangement of the parts 1 to 9 being the same.

Figure 10:
Fig. 10 is a view similar to Fig. 9, but illustrating a further modification.

In Fig. 10 the connection between the trunk, head, and associated parts, is somewhat different than that previously described. In this embodiment hemispherical shells or the like sockets 16 and 19 are secured to the head and trunk, respectively, in place of the disks 1 and 2, each of these sockets having a central opening through which a tube 17 passes. The lower end of the tube 17 extends part way into the body of the trunk and is rotatably supported by the trunk socket 19, being secured against shifting by collars 20 which surround the tube 17 on each side of the socket 19. The upper end of the tube 17 extends into the head of the animal and carries a transversely extending pin or rod 18, the ends of which are embedded in the head so as to support it for rocking movement. The operating rod 3ª extends through the tube 17 and projects outwardly through a slot adjacent to the upper end of the tube, the end of the rod 3ª being provided with a cross pin 21, the opposite ends of which are embedded in the head of the animal so that if the rod 3ª is moved upwardly or pulled downwardly the head is moved correspondingly, thus producing a rocking movement of the head about the pivot pin 18. The lower end of the rod 3ª extends downwardly through the trunk and opening in the washer 9, as in the previously described embodiments, terminating in a handle 5 which is spaced a suitable distance below the washer 9 so as to permit the rod 3ª to be moved upwardly and downwardly. With this construction and arrangement the head of the animal may not only be rotated about the axis of the tube 17, but also may be rocked to produce a nodding or bowing movement.

Figure 11:
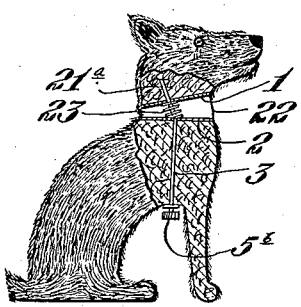
Figs. 11 and 12 are respective side and front elevations, partly in section, showing animal figures having a flexible connection between their heads and body portions or trunks.
Figure 12:
Figure 13:
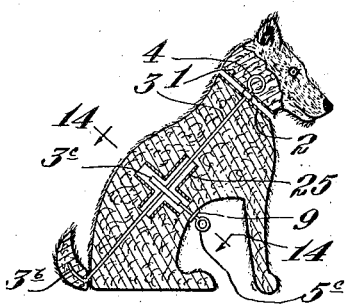
Fig. 13 is a side elevation, partly in section, of an animal having a remote control for both the head and tail.

In the embodiment shown in Figs. 11 and 12 the head and trunk are provided with joint disks 1 and 2 which are connected by means of a spiral spring 23. The space between the disks 1 and 2 is enclosed by a loose fabric covering 22 constituting the neck of the animal. The upper and lower ends of the fabric are drawn in about or otherwise connected to the disks 1 and 2 so as to permit a universal rocking movement of the head. The actuating rod 3 extends through the trunk, as in the embodiment shown in Fig. 9, and its upper end is formed with a bend 21 which extends through the bore of spring 9 and the opening in disk 1, terminating a slight distance beyond the disk 1. The rod 3, between the bend 21 and its lower end, is perfectly straight so that it may be rotated, and its lower end projects from the under surface of the trunk and carries a handle or control knob 5ᵇ which is provided with a recessed or ribbed periphery. The knob 5ᵇ may be manipulated by the finger of the hand holding the animal so as to rotate the operating rod 3, thus causing a universal rocking movement of the head, due to the eccentricity of the upper end of the operating rod relative to its axis of rotation.

The embodiments shown in Figs. 13 to 17 are somewhat similar to those above described, except that the tail is movably mounted on the trunk in addition to the head, and the control means effects the operation of both head and tail. In the embodiment shown in Fig. 13 the head and upper end of the trunk are provided with the usual joint disks 1 and 2 and the control rod 3 extends from its looped upper end 4 (which is embedded in the center of the head) longitudinally through the center of the trunk, to the tail, the lower end of the rod 3 being bent to provide a hook 3ᵇ which supports the tail in an upstanding position. At a point within the body, slightly rearwardly of the fore legs, there is provided a tube 25 which surrounds the rod 3, and mounted on the rod 3 within the tube 25 is a small gear wheel 24'. A control rod 3ᶜ extends through washer 9 and its inner end is formed with a row of teeth providing a rack 24 which projects through a transverse slot (Fig. 14) in the tube 25 and engages the gear 24'. The outer end of the control rod 3ᶜ is bent to provide a loop or handle 5ᶜ by means of which the rod 3ᶜ may be actuated. When holding the animal figure, a finger of the hand grasping the trunk may be inserted in the loop 5ᶜ and by reciprocating the rod 3ᶜ toward and away from the washer 9, the operating rod 3 may be rotated back and forth, thereby simultaneously rocking the head and tail.

Figure 15:
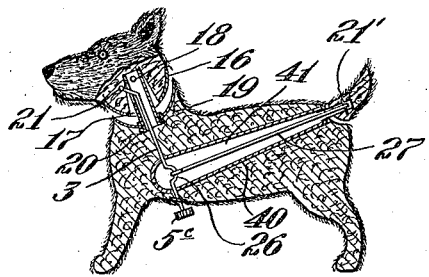
Fig. 15 is a side elevation, partly in section, showing a different type of actuating means for the head and tail.
Figure 14:
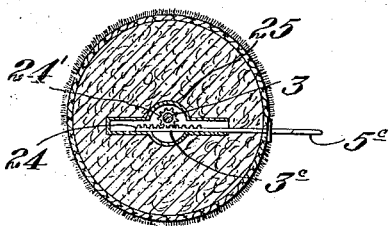
Fig. 14 is a detail illustrating the actuating means associated with the control member.

In the embodiment shown in Fig. 15 the trunk of the animal is provided with a casing 40 which defines an interior chamber 41 extending diagonally from the fore part of the trunk to the tail. The head is provided with a hemispherical socket 16 which fits into a like socket 19 carried by the trunk, and the tube 17 supports the head as in the embodiment shown in Figs. 10 and 11. In like manner the tail of the animal is connected to the trunk so that it may likewise be rocked back and forth in the same way as the head. The upper end of the head operating rod 3 has the same construction and arrangement as in Figs. 10 and 11, but between the end of the tube 17 and its lower end, the rod 3 is bent to provide a crank 26 disposed in the front end of the chamber 40 with a clearance sufficient to permit complete rotation of the head. The lower end of the rod 3 projects through the washer 9 and carries a handle 5ᵇ of the same type as shown in Figs. 11 and 12. A tail operating rod 27 is connected to the crank 26 and extends rearwardly to the tail, the end of the rod being bent at an angle to its axis and connected by a pin 21 to the tail in the same way that the rod 3 is connected to the head. By turning the handle 5ᵇ the rod 3 is rotated and the rod 27 is reciprocated, thus producing a swinging movement of the head and a simultaneous wagging movement of the tail. By reciprocating the handle 5ᵇ toward and away from the trunk a nodding movement of the head may be produced, as above described in connection with Fig. 10.

In place of the construction and arrangement shown in Figs. 10 and 15, the wagging movement of the tail may be produced by the arrangement shown in Fig. 15, wherein the tail is carried by a rod 28 which is pivotally secured between its ends to the wall 30 of the trunk by a pivot pin 29, the inner end of the rod 28 projecting into the chamber 41 and being bent to provide a hook which is connected to the end of rod 27 by a pivot pin 31.

Figure 17:
Fig. 17 is a view similar to Fig. 15, but illustrating a further modification.
Figure 16:
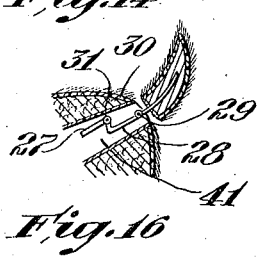
Fig. 16 is a fragmentary top plan view illustrating a modified arrangement for connecting the tail with the actuating rod.
Figure 18:
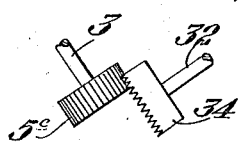
Fig. 18 is a detail view of the control means and associated parts shown in Fig. 17.

In Fig. 17 I have shown an animal figure simulating a cat having a head mounted on the trunk and an operating rod 3 which extends downwardly, projecting through the washer 9 at the under side of the trunk, as in the embodiment shown in Figs. 1 to 7. The end of the rod 3 is provided with a hand wheel 5ᵇ having a ribbed periphery constituting a gear wheel. The tail is similarly mounted on the looped end of an actuating rod 32 which is bent at 33 so as to hold the tail in an upstanding position. The rod 32 extends diagonally through the trunk, emerging at its under side and projecting through the washer or wear plate 9. The lower end of the rod 32 is provided with a control handle 34 having radially disposed teeth on its under surface, providing in effect a gear wheel adapted to mesh with the toothed hand wheel or gear 5ᵇ carried by the rod 3. The hand wheel 34 may either be spaced from the hand wheel 5ᵇ so as to permit an independent movement of the head and tail, or it may be positioned to engage the hand wheel 5ᵇ, as shown more clearly in Fig. 18, in which case the movement of both the head and tail may be effected by the manipulation of either hand wheel.

Although the embodiments herein shown are primarily intended for stuffed animal figures having long-haired fabric covers which are effective to conceal the remote control handles and finger movements, it is to be understood that they may also be used for animal figures having hollow trunks as in either case the actuating mechanism may be operated to impart life-like effects to the head as well as the tail movements of the animal figure.

While I have shown and described different desirable embodiments of the invention, it is to be understood that this disclosure is for the purpose of illustration and that various changes in shape, proportion and arrangement of parts, as well as the substitution of equivalent elements for those herein shown and described, may be made without departing from the spirit and scope of the invention as shown in the appended claims.

I claim:

1. A mechanical animal figure comprising a trunk, head and tail members carried by said trunk, one of said members being movably supported on said trunk, fore and hind legs secured to said trunk, a control handle arranged on the under side of said trunk between said fore and hind legs so as to be substantially concealed from view, operating means disposed within the body of the figure and connecting said handle to said one of said members and arranged to transmit motion from the control handle to said movably supported member, a carriage supporting said figure, and means mounted on said carriage and associated with said handle for detachably securing said figure to said carriage.

2. A mechanical animal figure comprising a trunk, head, and fore and hind legs, means for mounting the head for turning movement from side to side with respect to the trunk, a manually movable handle at the under-side of the trunk adjacent to and rearwardly of the fore legs, and a rotatable rod extending through the trunk and connected at one end to the head and at the other end to said handle whereby the head can be turned from side to side by turning the handle, the handle lying close to the trunk so that it can be turned inconspicuously by a hand holding the animal figure.

JOHANNES GOTTHILF DIETRICH.